United States Patent [19]

Okita

[11] Patent Number: 4,575,837

[45] Date of Patent: Mar. 11, 1986

[54] MEDIUM CLAMP MECHANISM

[75] Inventor: Masao Okita, Furukawa, Japan

[73] Assignee: Alps Electric Co., Ltd., Japan

[21] Appl. No.: 583,705

[22] Filed: Feb. 27, 1984

[30] Foreign Application Priority Data

Feb. 28, 1983 [JP] Japan .............................. 58-27257[U]

[51] Int. Cl.⁴ .......................... G11B 3/62; G11B 17/00
[52] U.S. Cl. .................................................... 369/270
[58] Field of Search ................................ 369/270, 271

[56] References Cited

U.S. PATENT DOCUMENTS

| | | | |
|---|---|---|---|
| 3,436,082 | 4/1969 | Bostrom et al. | 369/270 |
| 3,768,815 | 10/1973 | Mathurin . | |
| 3,898,314 | 8/1975 | Clou et al. . | |
| 4,022,478 | 5/1977 | Stewart | 369/270 |
| 4,208,682 | 6/1980 | Bryer | 360/99 |
| 4,408,318 | 10/1983 | Sugiura | 369/270 |
| 4,420,830 | 12/1983 | Green | 369/270 |

FOREIGN PATENT DOCUMENTS 177579 10/1983 Japan .................................. 369/270

*Primary Examiner*—Steven L. Stephan
*Attorney, Agent, or Firm*—Guy W. Shoup

[57] ABSTRACT

An improved medium clamp mechanism in a drive mechanism is disclosed which assures good centering and clamping of a medium such as a floppy disk and a video disk. The mechanism includes a pulley having a substantially U-shaped cross section, a hub frame and a hub having a cylindrical portion and a contiguous flanged portion and cooperating with the pulley to clamp a medium therebetween. The pulley has an inner diameter rather smaller than the diameter of a center clamp hole of the medium and has a tapered portion provided on the inner periphery adjacent the top thereof. Meanwhile, the outer diameter of the cylindrical portion adjacent the flanged portion of the hub is rather larger than the diameter of the clamp hole of the medium and another tapered portion is provided there such that a spacing is formed between the tapered portions of the hub and of the pulley.

3 Claims, 5 Drawing Figures

MEDIUM CLAMP MECHANISM

BACKGROUND OF THE INVENTION

This invention relates to a medium clamp mechanism, and more particularly to a medium clamp mechanism for fixing to a drive device a medium onto and from which information can be recorded and read out by rotating it on such a drive device loaded therewith.

As such media, there are floppy disks, direct access memory devices, video disks, and so on. However, the following description will be given generally in connection with floppy disks. In detailed construction, a floppy disk includes a disk which is called a medium and a jacket which contains the disk therein. It is to be noted, however, that the terms "medium" and "floppy disk" designate the same item all through the present specification.

A typical one of conventional medium clamp mechanisms in drive units for fixing and rotating such a medium loaded thereon will be first described with reference to FIGS. 1 and 2. The illustrated medium clamp mechanism includes a spindle 3 which extends through a frame 1 via a bearing 2. A pulley 4 is mounted at one end of the spindle 3 for integral rotation therewith. A medium 5 is received on the top of the pulley 4. A hub frame 6 is disposed above the medium 5, and a hub shaft 7 extends through the hub frame 6. A hub 8 is disposed around an end of the hub shaft 7 opposing to the pulley 4. A collet 10 is located around a bearing 9 above the hub 8 and is resiliently connected to the hub 8 by means of a spring 11. Also, the bearing 9 is resiliently connected to the inner wall of the hub frame 6 by means of a washer 12 and a spring 13. An E snap ring 14 is disposed at the other end of the hub shaft 7 which extends upwardly through the hub frame 6. Thus, the hub frame 6, the hub 8 and the collet 10 are resiliently interconnected in concentrical relationship around the hub shaft 7. In a medium clamp mechanism which has such a structure described just above, an inner bore of the pulley 4 is designed to have a diameter approximated to the diameter of a center clamp hole of the media 5 so that a clamping force can cause the collet 10 to slightly expand the hub 8 thereby to allow clamping and centering of the medium, as can be seen from an enlarged view of FIG. 2. Upon release, the collet spring 11 will push up the collet 10 to render the hub 8 free, thereby releasing clamping of the medium 5.

However, a conventional medium clamp mechanism which has such a construction as described just above has a defect that it cannot be well accommodated to variations in the diameter of center holes of media, resulting in unsatisfactory accuracy of centering of media, and besides, inward deformation of a hub upon clamping will further deteriorate such centering. Moreover, according to such a structure as described above, it has another defect that desired performances could not be attained without individual parts finished in high accuracy.

SUMMARY OF THE INVENTION

The present invention has been thus made to eliminate such defects of conventional mechanisms as described above, and it is an object of the present invention to provide a medium clamp mechanism which assures good centering and clamping of a medium on a medium drive unit regardless of any variation in the diameter of a center hole of the medium and which is composed of simplified parts and hence is easy to assemble.

According to the present invention, this object is attained by a medium clamp mechanism of the type which includes a pulley integrally secured to a spindle and having a cross section of a substantially U-shape, a hub frame having one end supported for pivotal motion, and a hub supported for rotation on a hub shaft which extends through said hub frame, said hub having a cylindrical portion adapted to be fitted in said substantially U-shaped pulley and a flanged portion provided contiguously on an outer peripheral surface adjacent the top of said cylindrical portion, and in which a medium is clamped between said pulley and said hub to drive the medium to rotate, wherein the dimension of the inner diameter of said U-shaped pulley is rather smaller than the dimension of the diameter of a clamp hole of the medium while a tapered portion is provided on the inner periphery adjacent the top of said pulley, and the outer diameter of said cylindrical portion adjacent said flanged portion of said hub is formed rather larger than the dimension of the diameter of the clamp hole of the medium while a tapered portion is provided on said cylindrical portion adjacent said flanged portion of said hub such that a spacing is formed between said tapered portion of said hub and said tapered portion of said pulley.

The foregoing and other objects and advantages of the present invention will be made apparent from a subsequent description of a perferred embodiment of the invention made with reference to the accompanying drawings.

DETAILED DESCRIPTION OF THE INVENTION

Figure 1:
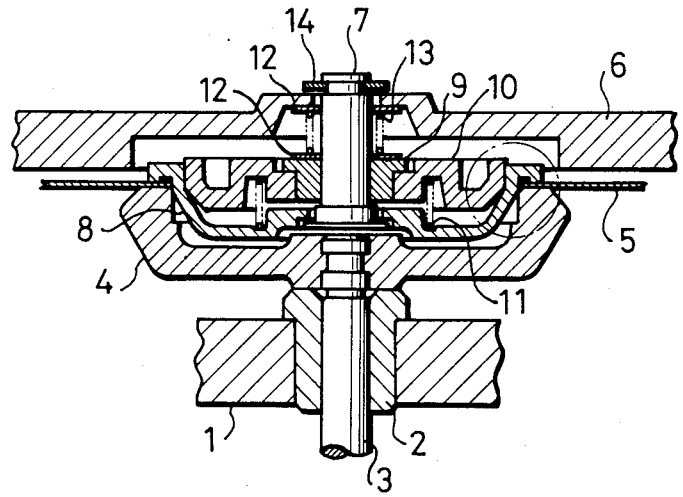
FIG. 1 is a cross sectional view showing a conventional medium clamp mechanism.
Figure 2:
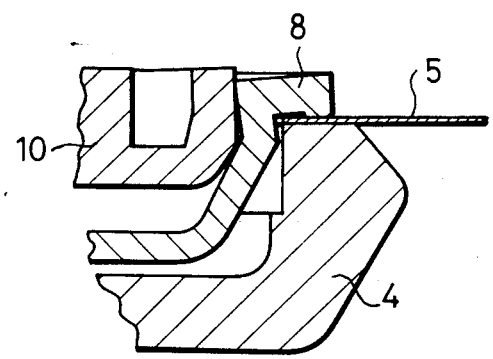
FIG. 2 is a partial cross sectional view, in an enlarged scale, showing the medium clamp mechanism of FIG. 1.

A preferred embodiment of the present invention will be described with reference to FIGS. 3 to 5 in which like parts are designated by like reference symbols to those of FIGS. 1 and 2.

Figure 3:
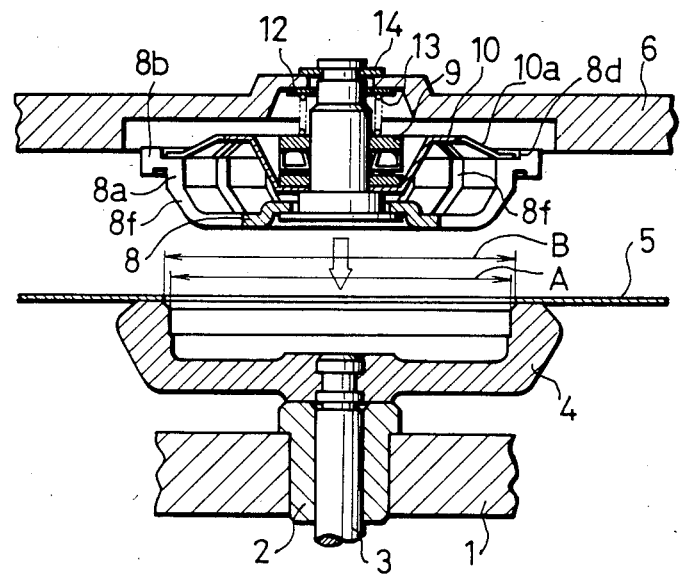
FIG. 3 is a cross sectional view of a medium clamp mechanism according to the present invention, showing relative positions of a hub, a medium and a pulley before the mechanism is brought into its clamping position.

Referring to FIG. 3, a medium clamp mechanism is in its releasing position before it clamps a medium. The medium clamp mechanism includes a spindle 3 which extends through a frame 1 via a bearing 2. A pulley 4 is integrally secured at an end of the spindle 3 for integral rotation therewith. The pulley 4 has a substantially U-shaped cross section to define an inner bore or recess therein and has a tapered face 4a formed on the inner periphery adjacent the top thereof as by chamfering (see FIG. 5). The diameter A of the inner bore of the pulley 4 is formed rather smaller than the diameter B of a center clamp hole of a medium 5 which is placed on the pulley 4.

A portion of the medium clamp mechanism which is shown as located above the medium 5 in FIG. 3 includes a hub shaft 7 that extends through a hub frame 6 which has an end mounted for pivotal motion. A hub 8 is disposed around and engaged with a flanged portion of the hub shaft 7 at an end thereof opposing to the pulley 4. The hub 8 has a cylindrical portion 8a adapted to be fitted in the inner bore of the pulley 4 and a flanged portion 8b which extends laterally from the outer periphery of the top of the cylindrical portion 8a, and as a result, it has a substantially U-shaped cross section. The outer diameter of the cylindrical portion 8a adjacent the flanged portion 8b of the hub 8 is formed rather larger than the diameter of the center clamp hole of the medium 5 while a tapered portion 8c is provided there such that it cooperates with the tapered portion 4a of the pulley 4 to define a spacing therebetween. A spring plate 10 is disposed around the hub shaft 6 above and in concentric relationship to the hub 8 and engages with an inner peripheral surface of the flanged portion 8b of the hub 8. A ball bearing 9 is disposed above the spring plate 10, and a pressure spring 13 spirally extends around the hub shaft 7 between the ball bearing 9 and the inner wall of the hub frame 6 with a washer 12 interposed between the pressure spring 13 and the hub frame inner wall. An E snap ring 14 is attached to an inner end of the hub shaft 7 which extends upwardly above the hub frame 6, thereby unremovably joining together the hub frame 6, the spring plate 10 and the hub 8 in concentrical and resiliently yielding relationship. The spring plate 10 has a central portion suitably shaped by drawing to provide the same with rigidity while an outer half portion of the spring plate 10 has a plurality of radial slits formed therein to provide the same with resiliency. Accordingly, if the spring plate 10 is pushed or pressed in a direction of the thickness of material thereof, it will expand outwardly. In this case, accuracy in roundness is not required so high since slits 8f of the hub 8 and slits 10a of the spring plate 10 are independent of each other.

Figure 4:
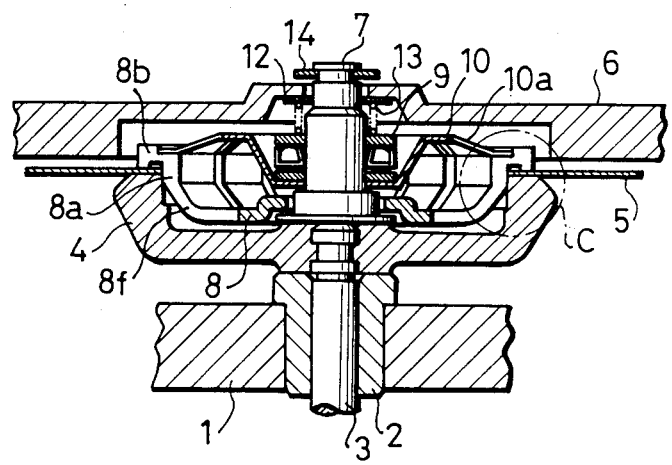
FIG. 4 is a similar view showing the medium clamp mechanism in its clamping position.
Figure 5:
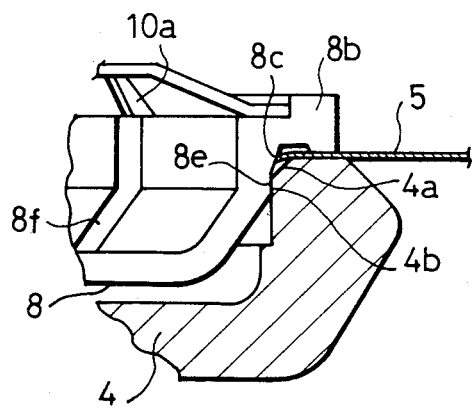
FIG. 5 is a partial cross sectional view, in an enlarged scale, showing a portion of the medium clamp mechanism indicated by a circle C of FIG. 4.

When the portion of the medium clamp mechanism having the construction as described above which is located above the medium 5 as seen in FIG. 3 is engaged with the pulley 4 as shown in FIG. 4, the clamping force causes the spring plate 10 to press the hub 8 against the top face of the spindle 3 via the hub shaft 7 while the spring plate 10 expands itself radially outwardly. In the mean time, the medium 5 is fitted intermediately onto the tapered outer peripheral portion 8c of the hub 8 and centered thereby. The hub 8 is pressed by the spring plate 10 to expand radially outwardly until an axially linearly extending outer peripheral surface 8e of the hub 8 is contacted with the inner surface 4b of the pulley 4. As for basic variations in the inner diameter of the medium 5 (the diameter of a center clamp hole of a 5 inch medium is 28.575+0.025), the medium 5 is fitted around midway of the tapered portion 8c of the hub 8 and is curved or deformed downwardly a little into a dish-like configuration and thus clamped by the tapered portion 8c of the hub 8 since the tapered portion 8c of the hub 8 is formed such that its minimum diameter is smaller than the minimum allowable dimension of the hole of the medium 5 while its maximum diameter is larger than the maximum allowable dimension of the hole of the medium 5 when the axially linearly extending outer peripheral surface 8e of the hub 8 is in pressure contact with the inner peripheral surface 4b of the pulley 4. In this case, the deformation of the medium 5 is restricted to such an extent as to allow no permanent deformation of the medium 5 due to the spacing formed between the tapered portion 4a of the pulley 4 and the other tapered portion 8c of the hub 8. The deformed condition of the medium 5 can be observed more precisely from an enlarged view of FIG. 5. Upon releasing of the medium clamp mechanism, the force of the pressure spring 13 is removed from the spring plate 10, and hence the hub 8 is allowed to return to its free condition due to the restoring force of the spring plate 10.

According to the embodiment as described above, since a tapered portion is provided on an outer periphery of a hub and also on an inner periphery of a pulley, media can be assuredly centered and clamped regardless of any variation in diameter of holes of the media. Also, since a spring plate is employed for a hub pressing means, there is no need of a collet nor a collet spring of complicated configurations which have been required for conventional medium clamp mechanisms, and hence also the hub can be simplified in configuration accordingly. Further, since a ball bearing is employed which will provide the medium clamp mechanism with a bearing for a thrust direction, frictional resistance to rotation is reduced so that torque of a drive motor can be transmitted to a medium effectively.

As apparent from the foregoing description, according to the present invention, a medium clamp mechanism in a drive mechanism for a floppy disk, a video disk, and so on, can be provided which have various advantages that it is good in centering and clamping functions, easy to attain high accuracy of individual parts, reduced in number of parts, and hence can be assembled well at a reduced cost.

What is claimed is:

1. In a medium clamp mechanism of the type having a pulley integrally secured to a spindle and having a U-shape cross section, a hub frame supported for a clamping motion toward said pulley, and a hub supported for rotation on a hub shaft which extends through said hub frame, said hub having a cylindrical portion adapted to be fitted into said U-shaped pulley and a flanged portion adjacent a top part of said cylindrical portion, by which a medium having a clamp hole is clamped between said pulley and said hub to rotate the medium, the improvement comprising:

a spring plate disposed on said hub shaft concentric with said hub and adapted to be pressed by the clamping motion of said hub into said pulley, said spring plate having a radially slitted spring fingered outer portion engaged with said flanged portion of said hub which is radially expanded when the spring plate is pressed so as to radially expand the flanged portion of the hub, whereby said cylindrical portion of the hub is pressed against said U-shaped pulley.

2. The medium clamp mechanism of claim 1, wherein an inner diameter of said U-shaped pulley is smaller than the clamp hole of the medium and a first tapered portion is provided at a top part of said pulley, and said cylindrical portion of said hub includes a second tapered portion tapering outward to said flanged portion with an outer diameter larger than the clamp hole of the medium so that the clamp hole is centered and resiliently deformed by said second tapered portion when said hub is moved into said pulley, said first tapered portion of said pulley and said second tapered portion of said hub being dimensioned so as to define a space therebetween to prevent any permanent deformation of the clamp hole of the medium.

3. The medium clamp mechanism of claim 1, wherein elastic biasing means are provided on the hub shaft for pressing said spring plate during the clamping motion of said hub into said pulley, and a bearing is disposed between said elastic biasing means and said spring plate.

* * * * *